United States Patent [19]

Litt et al.

[11] Patent Number: 4,777,234

[45] Date of Patent: Oct. 11, 1988

[54] SILICON CARBIDE PRECURSORS

[75] Inventors: Morton H. Litt, University Heights, Ohio; Kanta Kumar, St. Paul, Minn.

[73] Assignee: Case Western Reserve University, Cleveland, Ohio

[21] Appl. No.: 899,680

[22] Filed: Aug. 25, 1986

[51] Int. Cl.$^4$ .............................................. C08G 77/04
[52] U.S. Cl. ........................................ 528/37; 501/88; 528/10; 528/43; 556/430
[58] Field of Search .............................. 528/37, 10, 43; 556/430; 501/88

[56] References Cited

U.S. PATENT DOCUMENTS 4,537,942 8/1985 Brown-Wensley et al. ......... 556/430
4,590,253 5/1986 Hasegawa et al. .................. 556/430

Primary Examiner—Melvyn I. Marquis
Attorney, Agent, or Firm—Fay, Sharpe, Beall, Fagan, Minnich & McKee

[57] ABSTRACT

The present application relates to novel silicon based preceramic polymers useful in the production of silicon carbide reinforcement fibers, and to the novel synthesis procedures by which such polymers and reinforcement fibers may be produced.

These novel polymers are produced by preparing phenyl substituted polyalkylcyclohexasilane compounds, which are then converted to the corresponding halogen substituted compound by reaction with the appropriate ammonium halide and sulfuric acid in a suitable solvent such as benzene, and then polymerizing the substituted cyclohexasilane by reaction with an alkali metal, again in a suitable solvent such as toluene or benzene, to produce polymers of the general formula:

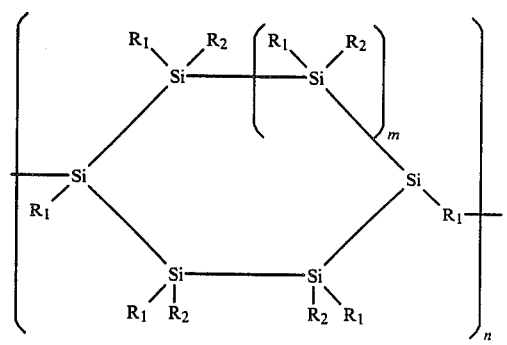

wherein $R_1$ is lower alkyl, preferably methyl or ethyl, $R_2$ is lower alkyl or hydrogen, m is 0 to 5, n is at least 3. The polymers of the present invention have an average molecular weight of from about 1000 to 100 million or more.

9 Claims, No Drawings

SILICON CARBIDE PRECURSORS

BACKGROUND OF INVENTION

The invention described herein was made in the performance of work under NASA Grant Number NAG3-446 and in subject with the provisions of 35 U.S.C. 202.

The present application relates to new silicon based preceramic polymers useful in the production of silicon carbide reinforcement fibers, and to the novel synthesis procedures by which such polymers may be produced.

It is well known that silicon carbide can provide highly desirable and unique properties due to its chemical inertness, high temperature stability, semi-conductor properties, and especially its extreme hardness. Fibers of silicon carbide can be used in a wide variety of applications, particularly as reinforcements for composites.

The problems encountered in prior attempts to utilize silicon carbide reinforcements in most applications were due to the great difficulty experienced in attempting to form the silicon carbide reinforcement material into the desired configuration. One suggested means of overcoming these problems was to employ silicon based preceramic polymers, such as polycarbosilanes. These polycarbosilanes are prepared by a controlled pyrolysis of polydimethylsilanes, which in turn are typically prepared from dimethyldichlorosilane and Na metal as shown below.

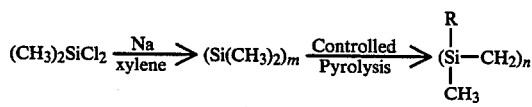

wherein R is hydrogen or methyl

From the hexane soluble non-volatile polymer fraction, fibers could be melt spun, which could be subsequently cross-linked by surface oxidation in air, and then pyrolyzed at high temperature in an inert atmosphere, to ultimately yield silicon carbide fibers. Such procedures are, for example, suggested by Yajima et al., synthesis of continuous silicon carbide fibers with high tensile strength and high Young's modulus, Journal of Materials Science, 13, 1978 (2569–2575), who postulated a structure as follows:

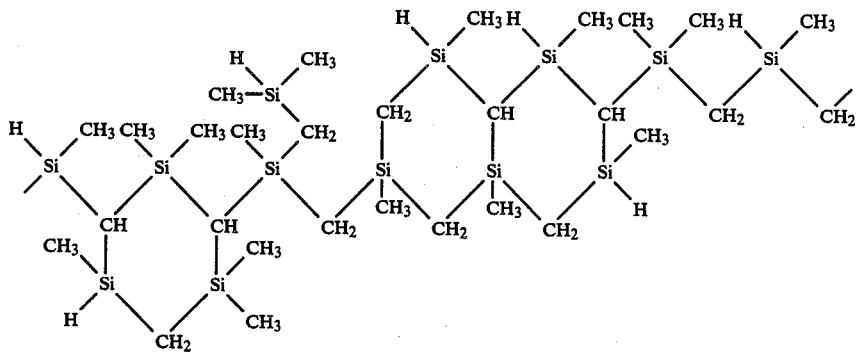

The structure has many cyclized units in it and it is well known that poly(dimethylsilanes) tend to cyclize and volatilize when heated.

It was subsequently suggested that volitilization could be prevented by replacing some of the methyl groups by phenyl groups; however the yield of silicon carbide in fact dropped, since the ultimate percent of volatilization increased. These procedures also tended to result in the formation of significant yields of graphite. In general, the methods heretofore employed produced a rather low "char yield", that is to say a rather low ultimate yield of silicon carbide as a function of the preceramic polymer (after it had been formed into the desired shape, but prior to the oxidative cross linking and/or high temperature pyrolization steps.)

It will of course be obvious that such weight losses are highly undesirable, not only from the economic point of view but also from the point of view of the resultant inherent problems of shrinkage, displacement and the like. For this reason it has long been desired to discover a silicon based preceramic polymer having a much higher yield of pyrolized silicon carbide fiber, preferably at least in the range of from about 50 to 75%.

SUMMARY OF THE INVENTION

We have now found that it is possible to synthesize silicon based preceramic polymers having theoretical ultimate char yields of 75% or more, and observed char yields of over 50%. These novel polymers are produced by preparing phenyl substituted polyalkylcyclohexasilane compounds, which are then converted to the corresponding halogen substituted compound by reaction with the appropriate ammonium halide and sulfuric acid in a suitable solvent such as benzene, and then polymerizing the substituted cyclohexasilane by reaction with an alkali metal, again in a suitable solvent such as toluene or benzene, to produce polymers of the general formula:

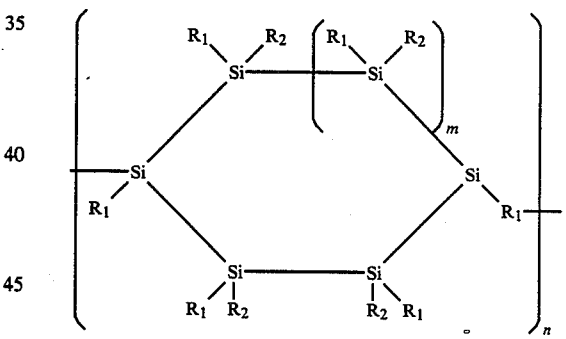

wherein $R_1$ is lower alkyl, preferably methyl or ethyl, $R_2$ is lower alkyl or hydrogen, m is 0 to 5, n is at least 3. The polymers of the present invention have an average molecular weight of from about 1000 to 100 million or more. While the structural formula above illustrates the polymerization bonds apparently para to each other, it will of course be understood that these bonds could be ortho or meta to each other, and that in a polymer chain of any significant length, all three isomers will likely be present at some point in the polymer chain.

PREFERRED EMBODIMENTS OF THE INVENTION

The preferred polymers of the present invention include a polydecamethylcyclohexasilanes having a molecular weight in the range of from about 5,000 to 5,000,000 and correspond to the general formula:

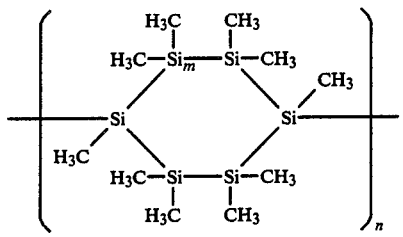

wherein m is 0 to 2 and n is at least 5.

The preferred process for synthesizing the polymers of the present invention comprises reacting phenyl methyl silicon chloride with methyl silicon chloride to form phenyl substituted polymethylcyclohexasilanes as illustrated by the equation:

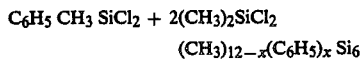

$$C_6H_5 CH_3 SiCl_2 + 2(CH_3)_2SiCl_2$$
$$(CH_3)_{12-x}(C_6H_5)_x Si_6$$

wherein X=0 to 6. The diphenyl substituted fraction is isolated, reacted with ammonium chloride and sulfuric acid, in a suitable solvent, to form dichlorodecamethylcyclohexasilane. Polydecamethylcyclohexasilane is then produced by a condensation polymerization reaction of the dichlorodecamethylcyclohexasilane with an alkali metal, preferably sodium, is a suitable solvent. The following equations illustrate these reactions:

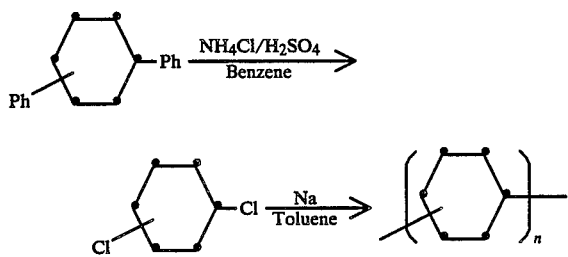

The following examples will serve by way of illustration and not by way of limitation to describe the compositions and methods of the present invention.

EXAMPLE I

Preparation of Poly(decamethylcyclohexasilanes)

An assembly was made of a 100 ml, three-necked round bottomed flask equipped with a condenser, a magnetic stirrer, a pressure equalized addition funnel, a nitrogen inlet and a rubber septum. The reaction was carried out in an inert atmosphere of dry nitrogen circulated through the flask.

15 ml of distilled dry toluene, which had been dried by refluxing over Na/benzophenone, was introduced through the septum in the flask. 0.276 gm of Na in the form of peas, corresponding to 25% molar excess was added to the toluene and heated to boiling temperature with stirring to disperse the sodium. 1.85 gm of dichlorodecamethylcyclohexasilanes in 10 ml of dry toluene were added dropwise over 10–15 minute period while stirring. The color of the reaction mixture became dark violet. The reaction mixture was refluxed for 2.45 hours after which heat was turned off; stirring was continued overnight. The reaction was quenched by dropwise addition of an ethanol-water mixture. Excess water was added to dissolve the salt, and the organic layer was separated, dried over anhydrous $Na_2SO_4$ and solvent was stripped off on a rotary evaporator. 1.1 gm (73.3%) solid polymer was obtained.

EXAMPLE II 0.17 gm of poly(decamethylcyclohexasilanes) was sealed in a tube under vacuum. The tube was heated at 200°±1° C. for 5 hours. Thermogravimetric analysis of the cured polymer from 50° to 600° C. at a heating rate of 10° C./min yielded 51% silicon carbide.

It will of course be understood that the polymers of Example I can be formed into the desired reinforcing configuration by a variety of molding or other techniques well known to those skilled in the art. It will also be obvious that a wide variety of changes and substitutions can be made in the specific materials and reactions hereinbefore set forth, and that it is our intention to be limited only by the appended claims.

What is claimed is:

1. A polyalkylcyclohexasilane preceramic polymer having a molecular weight of at least 1000 and having the general formula:

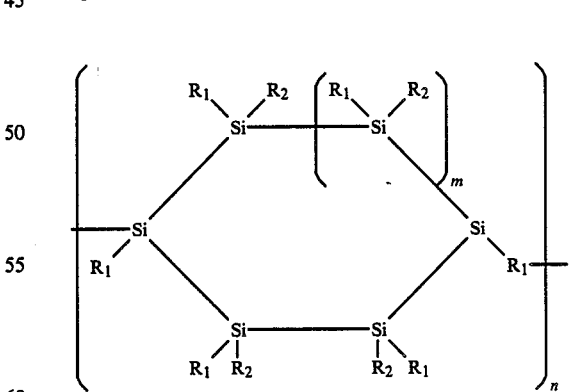

wherein $R_1$ is lower alkyl, $R_2$ is hydrogen or a lower alkyl radial, m is 0 to 5, and n is at least 3 and wherein the linkages between monomer units are the same or different and is 1,2-, 1,3- or 1,4-.

2. The polymer of claim 1 wherein said polymer corresponds to the formula:

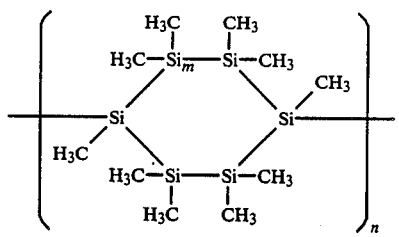

3. The polymer of claim 1 wherein said polymer corresponds to the formula:

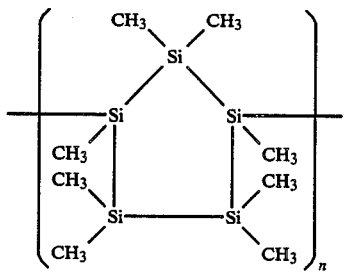

4. The method of preparing a silicon based preceramic polymer, the steps which comprise converting a phenyl substituted polyalkylcyclohexasilane to the corresponding halogen substituted cyclohexasilane analogue by reaction with an ammonium halide and sulfuric acid in a solvent and then polymerizing said halogen substituted cyclohexasilane by reaction with an alkali metal, to produce a polymer of the general formula:

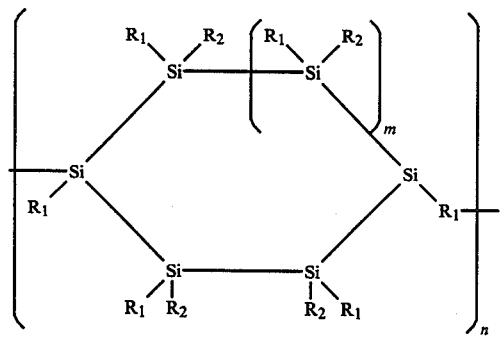

wherein $R_1$ is lower alkyl and $R_2$ is hydrogen or a lower alkyl, m is 0 to 5 and n is at least 3, and said polymers have an average molecular weight of from about 1000 to 100,000,000.

5. The method of claim 4 wherein said polymer corresponds to the formula:

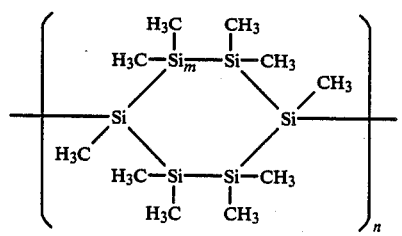

6. The method of claim 4 wherein said polymer corresponds to the formula:

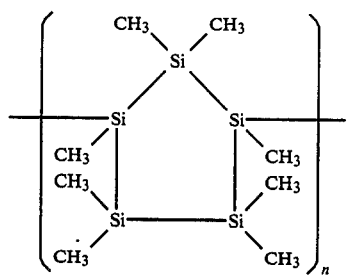

7. The method of preparing a silicon carbide reinforcement, the steps which comprise: converting a phenyl substituted polyalkylcyclohexasilane to the corresponding halogen substituted cyclohexasilane analogue by reaction with an ammonium halide and sulfuric acid in a solvent and then polymerizing said halogen substituted cyclohexasilane by reaction with an alkali metal, to produce a polymer of the general formula:

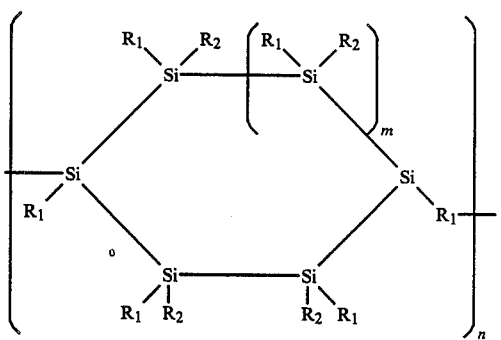

wherein $R_1$ is lower alkyl, $R_2$ is hydrogen or a lower alkyl, m is 0 to 5, and n is at least 3, and said polymers have an average molecular weight of from about 1000 to 100,000,000; forming said polymer into the desired reinforcing configuration, and pyrolyzing said formed polymer to silicon carbide.

8. The method of claim 7 wherein said polymer corresponds to the formula:

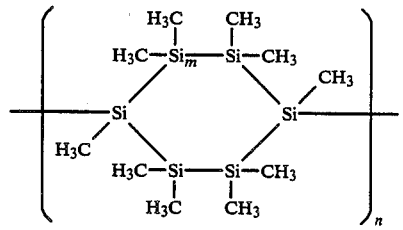

9. The method of claim 7 wherein said polymer corresponds to the formula:

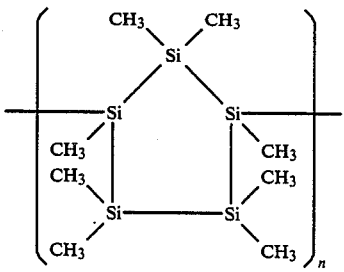

* * * * *